United States Patent Office 3,729,504
Patented Apr. 24, 1973

---

3,729,504
BIS-N,N-DIFLUOROCARBAMATES
Vytautas Grakauskas, Arcadia, Calif., assignor to Aerojet-General Corporation, El Monte, Calif.
No Drawing. Continuation of application Ser. No. 554,947, May 31, 1966, which is a continuation-in-part of application Ser. No. 404,210, Oct. 14, 1964, both now abandoned. This application July 6, 1970, Ser. No. 56,140
Int. Cl. C07c 25/04
U.S. Cl. 260—482 B                 2 Claims

ABSTRACT OF THE DISCLOSURE

Novel fluorinated compounds of the formula:

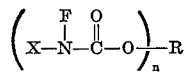

wherein X is selected from the group consisting of hydrogen and fluorine, R is an organic radical selected from the group consisting of hydrocarbon, halohydrocarbon and nitrohydrocarbon radicals having a valency equal to $n$, and $n$ is an integer of from 1 to about 10, and process for their manufacture involving direct fluorination through reacting fluorine with a compound of the formula:

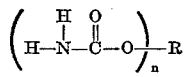

wherein R and $n$ have the foregoing definitions.

---

This application is a continuation of application Ser. No. 554,947, filed May 31, 1966, now abandoned and which in turn is a continuation-in-part of applicant's copending application Ser. No. 404,210, filed Oct. 14, 1964, now abandoned, the disclosure of which is expressly incorporated herein by reference.

This invention pertains to novel N-fluorocarbamates and to their method of preparation.

Generally, in the prior art, the use of elemental fluorine as a fluorinating agent in organic synthesis has been avoided since reactions involving direct fluorination have been found to be very vigorous. Normally, fluorination reactions are highly exothermic and the heat of reaction is sufficient to break the carbon-to-carbon linkages in the organic compounds being treated. For this reason, heretofore the yields of organic compounds of the same carbon skeletal arrangement as the starting material have been low.

It has now been found that organic N-fluorocarbamates may be obtained in good yield and purity by direct fluorination. The drawbacks noted in the prior art regarding direct fluorination are surprisingly absent from the present invention.

It is an object of this invention to prepare a novel class of fluorocarbamates.

It is another object of this invention to prepare these compounds by direct fluorination in a novel manner.

These and other objects of this invention will be apparent from the detailed description which follows.

Briefly, the present invention comprises novel N-fluorocarbamates having the following general formula:

(I)       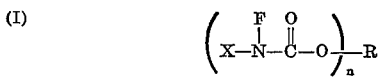

wherein X is selected from the group consisting of hydrogen and halohydrocarbon, nitrohydrocarbon, and fluorine, R is a monovalent or polyvalent organic radical, e.g., hydrocarbon, nitrohydrocarbon and halohydrocarbon, and $n$ is an integer of from 1 to about 10, preferably 1 or 2. The valency of R is normally equal to $n$. Preferred R groups include monovalent organic radicals such as alkyl, aryl, nitroaryl, nitroalkyl, haloaryl, and haloalkyl. Preferred divalent R groups include alkylene, arylene, haloarylene, haloalkylene, nitroarylene, and nitroalkylene. In general, R is a lower organic moiety and contains from 1 to about 20 carbon atoms.

The compounds of the above formula are prepared in accordance with the following novel general reaction equation:

(II)    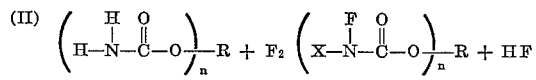

wherein X, R and $n$ are as defined above.

Illustrative of the novel compounds within the scope of Formula I are methyl N-fluorocarbamate,
ethyl N-fluorocarbamate,
isopropyl N-fluorocarbamate,
phenyl N-fluorocarbamate,
tolyl N-fluorocarbamate,
2-nitropropyl N-fluorocarbamate,
2-chlorobutyl N-fluorocarbamate,
decyl N-fluorocarbamate,
naphthyl N-fluorocarbamate,
ethyl N,N-difluorocarbamate,
butyl N,N-difluorocarbamate,
hexyl N,N-difluorocarbamate,
octyl N,N-difluorocarbate,
p-nitrophenyl N,N-difluorocarbamate,
p-chlorophenyl N,N-difluorocarbamate,
p-bromophenyl N,N-difluorocarbamate,
ethylene-bis-N-fluorocarbamate,
2-nitro-propylene-bis-N-fluorocarbamate,
phenylene-bis-N-fluorocarbamate,
phenylene-bis-N,N-difluorocarbamate,
2-chloro-propylene-bis-N-fluorocarbamate,
1,10-decamethylene-bis-N-fluorocarbamate,
1,5-pentamethylene-bis-N,N-difluorocarbamate and
3-nitro-1,5-pentamethylene-bis-N,N-difluorocarbamate.

The temperature at which these fluorination reactions are carried out is not critical. Normally, it is desirable to keep the temperature as low as possible when working with fluorine, and thus the preferred reaction temperature is between about −40° C. and about +40° C. More preferably the reaction is carried out between the temperature of about −5° C. and +5° C.

The fluorine gas used in this invention may be diluted with an inert gas such as helium or nitrogen so as to improve the control of the rate of fluorine addition.

The fluorinations of this invention may be carried out in any conventional reactor. However, for long reactor life, those portions of the reactor which come in contact with fluorine should be coated with material such as nickel or polyethylene.

The fluorination reaction of this invention is preferably, although not necessarily, carried out in a substantially inert moderator. The term "substantially inert" as used throughout the specification and claims is intended to include any moderator which is less reactive with fluorine than the carbamate compound being fluorinated.

The most suitable substantially inert moderators are those less than one quarter as reactive with fluorine as the carbamate compounds. The moderator of this invention is any polar or non-polar material in which the carbamate compound being fluorinated is at least partially soluble. Thus the moderator may be a complete solvent for the material being fluorinated. Likewise, the moderator may be a material in which the carbamate compound forms only a partial suspension. Preferably, although not necessarily, the carbamate compound is soluble in the moderator at least to the extent of 1 part by weight per 100 parts of the moderator. Use of the moderator is an essential part of the fluorination reaction. The moderator serves not only as a carrier for the reaction but is also essential to the controlled fluorination of the carbamate compound.

I am not certain as to the exact mechanism by which the moderators control the fluorination. However, the moderator is known to aid in the promotion of selective fluorination, i.e., the fluorination is caused to occur only in the most reactive site in the carbamate compound. The specific moderator chosen is not critical and its selection depends upon such factors as cost, availability, inertness and solvent characteristics.

The preferred moderators are those polar and non-polar materials which are liquid within a temperature range of about $-40°$ C. to about $+40°$ C. This does not mean that the moderator must be liquid throughout this entire range. Rather, the preferred moderators are liquid over at least some portion of this range, that is, they have a normal melting point either below or within this range. Typical of the suitable moderators for use in the practice of this invention are the hydrocarbon alkanes and especially the hydrocarbon alkanes having from 5 to about 10 carbon atoms, such as pentane, hexane, octane, nonane and decane. Another group of suitable moderators are the haloalkanes having from 1 to about 8 carbon atoms, such as methylene dichloride, ethylene chloride, chloroform and carbon tetrachloride. Still another class of moderators are the aromatic hydrocarbons having from 6 to about 12 carbon atoms, such as benzene, toluene and the ortho, meta and para isomers of xylene. The chlorinated aromatic hydrocarbons containing 6 to 12 carbon atoms may also be used. Illustrative of these are monochlorobenzene and chlorotoluene.

Other suitable moderators include the aliphatic ketones, having the formula:

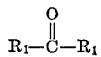

and ethers having the formula:

$$R_1\text{—}O\text{—}R_1$$

and the dialkyl substituted amides having the formula:

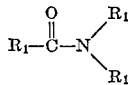

wherein in the above formula the $R_1$ groups are alkyl, and preferably lower alkyl having from 1 to about 10 carbon atoms, such as methyl, ethyl, pentyl and octyl. Specific ketones include dimethyl ketone, diethyl ketone and methyl ethyl ketone. The ethers include dimethyl ether, diethyl ether and diisopropyl ether. The substituted amides include dimethyl formamide, diethyl formamide and dimethyl acetamide.

Still other moderators are water, the lower alkanols having from 1 to about 10 carbon atoms and the lower alkylene glycols having from 1 to about 10 carbon atoms. Suitable lower alkanols and alkylene glycols include methanol, ethanol, isopropanol, ethylene glycol, propylene glycol and butylene glycol. Especially preferred moderators are the aliphatic nitriles such as acetonitrile, propiontrile, butyronitrile or any other aliphatic nitrile containing from about 2 to 12 carbon atoms.

It is to be understood that mixture of any of the foregoing moderators may be employed in the practice of this invention. Acetonitrile is the preferred moderator because of its low cost and ready availability. However, lower aliphatic alcohols such as methanol, ethanol, and isopropanol have been found to give very good results. It is surprising that the fluorination reaction can be carried out in lower aliphatic alcohols since the introduction of fluorine into the lower aliphatic alcohol would normally be expected to cause fires and explosions. Fluorination reactions of this invention were found to proceed very satisfactorily in the lower aliphatic alcohols.

The amount of the moderator employed is not critical. Normally the weight ratio of moderator of the carbamate compound being fluorinated is within the ratio from about 0.5 to about 200, and more preferably within the range of from about 1.0 to about 20.

In the fluorinations of this invention the proportions of the reactants are not critical. Normally the organic primary carbamate compound and fluorine should be used in approximately stoichiometrically equivalent amounts since the use of excessive fluorine may cause extensive reaction with the moderator resulting in undesirable contamination of the desired product.

The carbamate compounds of this invention may be isolated in conventional manner, i.e., by filtration, crystallization, extraction and/or distillation.

The carbamate starting materials for Equation II may be prepared by various procedures known to those skilled in the art. One known procedure is to react an alkali metal cyanate with an alcohol in accordance with the following equation:

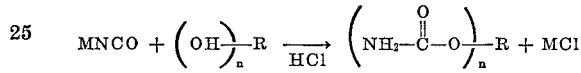

Alternatively, the carbamate may be obtained as follows:

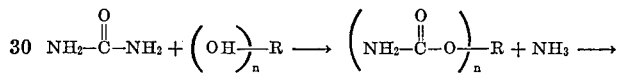

Fluorination reactions in this invention may be carried out under any suitable pressure. Normally atmospheric pressure is used since it is most convenient. However, it may be sometimes desirable to conduct the flurination under elevated pressure in order to increase the solubility of the fluorine in the moderator.

The products of reaction (II) may be converted to difluoramine in accordance with the following equation:

(III)

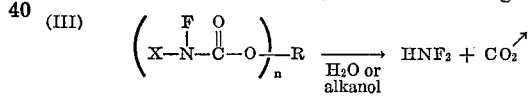

If fluorination reaction (II) is conducted in the presence of water or an alkanol moderator, the reaction passes through the fluorocarbamate to yield difluoramine directly. Thus, by the present invention, there is provided a class of compounds which may be readily converted to difluoramine. Further, there is also provided a means of directly producing difluoramine. The flexibility of these procedures is of great value since difluoramine is widely used as an intermediate in the preparation of other N-F compounds.

Polymers containing a plurality of N-fluoro- or N,N-difluoro-carbamate substituents may be obtained by fluorination of polymers containing pendant carbamate groups in accordance with this invention. For example, polyvinyl-N-fluorocarbamate may be obtained from polyvinyl carbamate.

The examples which follow are presented only for purposes of illustration and should not be regarded as limitative of the scope of our invention in any way. In the examples, percentages are by weight and gas volumes are at standard temperature and pressure unless otherwise indicated.

EXAMPLE I

Preparation of n-butyl N,N-difluorocarbamate

A solution of 9.4 grams n-butyl carbamate (0.08 mole) in 320 ml. dry ethylene chloride was fluorinated with elementary fluorine (diluted with nitrogen 1:4) at $-10°$ C. until 3.5 to 4.0 liters of fluorine gas was passed into the reaction mixture. At the end of the run the solvent was removed at reduced pressure and the residue, a pale yellow liquid, was fractionated to give 6 grams of a colorless liquid, B.P. 60 to 60° C./25 to 30 mm., $n_D^{25}$ 1.3780. This material was redistilled and a middle cut, $n_D^{25}$ 1.3710, was taken for elemental analyses.

*Analysis.*—Calc'd for $NF_2COOC_4H_9$, $C_5H_9F_2NO_2$ (percent): C, 39.22; H, 5.92; F, 24.82; N, 9.14. Found (percent) C, 39.70; H, 6.40; F, 21.40; H, 9.16.

EXAMPLE II

Preparation of methyl N,N-difluorocarbamate

A solution of 75 grams (1.0 mole) of methyl carbamate in 400 ml of n-butyronitrile was fluorinated with elementary fluorine (diluted with nitrogen; 1:4) at 0 to 5° C. until 45 liters (2 moles) of fluorine gas was consumed. At the end of the run the fluorination mixture was treated with two moles of sodium fluoride to complex hydrogen fluoride. The solution was filtered and subjected to fractional distillation. Methyl N,N-difluorocarbamate, B.P. 35 to 38° C./150 mm., was obtained in 50 percent yield. An analytical sample was purified by gas chromatography.

*Analysis.*—Calc'd for $C_2H_3NF_2O_2$ (percent): C, 21.63; H, 2.72; N, 12.61; F, 34.21. Found (percent): C, 22.0; H, 2.97, N, 12.1; F, 34.0.

EXAMPLE III

Preparation of ethyl N,N-difluorocarbamate

A solution of 89 grams (1.0 mole) of ethyl carbamate in 350 ml. of n-butyronitrile was fluorinated with elementary fluorine (diluted with nitrogen; 1:4) until two moles of fluorine was consumed. The reaction miture was worked up in the same manner as described in the previous example to give ethyl N,N-difluorocarbamate, B.P. 32 to 34° C./100 mm. (40 percent yield). The material was contaminated with n-butyronitrile and an analytical sample was obtained by gas chromatography.

*Analysis.*—Calc'd for $C_3H_5NF_2O_2$ (percent): C, 28.8; H, 4.0; N, 11.2; F, 30.4. Found (percent): C, 28.6; H, 4.2; N, 11.0; F, 29.5.

EXAMPLE IV

Preparation of i-propyl N,N-difluorocarbamate

A solution of 51 grams (0.5 mole) of isopropyl carbamate in 300 ml. of methyl formate was fluorinated at −45° C. until one mole of fluorine was consumed. The fluorination mixture was warmed to 0 to 5° C. and washed with three 100-ml. portions of ice water. The organic solution was dried, filtered, and concentrated. The residual liquid was fractionated to give 32 grams of isopropyl N,N-difluorocarbamate. B.P. 41 to 42° C./60 mm.

*Analysis.*—Calc'd for $C_4H_7NF_2O_2$ (percent): C, 34.5; H, 5.1; N, 10.1; F, 27.3. Found (percent): C, 34.8; H, 4.7; N, 9.9; F, 26.5.

EXAMPLE V

Hydrolysis of isopropyl N,N-difluorocarbamate

To 30 ml. of 25 percent aqueous sulfuric acid was added at 25° C. dropwise with stirring 4.17 grams (0.03 mole) of isopropyl N,N-difluorocarbamate. The reaction mixture was heated to 65 to 70° C. and the gaseous reaction products escaping from the reactor were condensed in a −80° C. cooling trap. At the end of the run the liquid in −80° C. trap was purified by trap-to-trap distillation to give 1.6 grams of difluoramine (100 percent yield). The compound was identified by its infrared spectrum.

EXAMPLE VI

Hydrolysis of n-butyl N,N-difluorocarbamate

To 10 ml. water was added with stirring at 20° C. 1.0 gram of n-butyl N,N-difluorocarbamate over a period of 5 minutes. The reactor was connected in series with an evacuated infrared gass cell and the gaseous products escaping from the reaction mixture were allowed to pass into the cell. The decomposition was slow at 20° C., but the rate of reaction increased rapidly with increasing temperature. The infrared spectrum of the gaseous product was taken and it was found that the material was a mixture of difluoramine and carbon dioxide.

EXAMPLE VII

Preparation of ethyl N-fluorocarbamate

A solution of 45 grams ethyl carbamate (0.5 mole) in ca. 700 ml. water was prepared in a one-liter four-necked round-bottom flask equipped with gas inlet and outlet tubes, a mechanical stirrer and a thermometer. The solution was cooled to 0 to 5° C. and into it was passed through the gas inlet tube extending to the bottom of the reaction flask, a stream of fluorine (2 to 4 liters/hour) gas diluted with nitrogen (8 to 10 liters/hour). The reaction temperature was kept at 0 to 5° C. throughout the run by means of an ice-water cooling bath. Soon after beginning of the fluorination, considerable amounts of gaseous products possessing strong oxidizing properties, began to escape from the reaction flask. Some of the gaseous material was condensed at −120° C., and a sample of the material was allowed to evaporate into an evacuated infrared gas cell. Infrared analysis showed that the gaseous material was a mixture of carbon dioxide and difluoramine. A sample of this gaseous mixture was passed at a slow rate into a trap cooled to −45° C. At this temperature the bulk of the difluoramine liquified (B.P. −24° C.) while the carbon dioxide passed through the trap. The contents of the −45° C. trap were allowed to evaporate into an evacuation infrared gas cell. Infrared analysis showed that the material was mainly difluoramine containing only traces (1 to 3 percent) of carbon dioxide.

The fluorination was continued until ca. one mole of fluorine was passed into the reaction mixture. At this point large amounts of unreacted fluorine began to escape from the reaction mixture, together with difluoramine and carbon dioxide, and further fluorination was discontinued. At the end of the run; the aqueous solution was extracted with five 75-ml. portions of diethyl ether. The combined ether extracts were dried and the solvent was removed by distillation. The residual oil was purified by distillation to give ca. 6 grams of water-clear liquid which is identified as ethyl N-fluorocarbamate.

EXAMPLE VIII

Preparation of ethyl N-fluorocarbamate

A solution of 270 grams ethyl carbamate (3.0 moles) in 3000 ml. water was fluorinated at 0 to 5° C. with elementary fluorine (diluted with nitrogen, 1:4) until 80 liters of fluorine gas was passed into the reaction mixture (7.0 hours). At the end of the run the clear and colorless aqueous solution was extracted with fifteen 250-ml. portions of methylene chloride and the combined extracts were dried over Drierite. The solution was filtered and the clear filtrate was concentrated at 20 to 30° C. and 20 to 25 mm. pressure to remove the solvent. The residue, pale yellow liquid, was fractionated to reduced pressure to give 75 grams of a colorless liquid, B.P. 30° C./0.1 to 0.3 mm., $n_D^{25}$ 1.3950. This material was found to be pure ethyl N-fluorocarbamate.

*Analysis.*—Calc'd for $C_3H_6FNO_2$ (percent): C, 33.64; H, 5.65; N, 13.08; F, 17.74. Found (percent): C, 33.72; H, 5.01; N, 13.40; F, 18.20.

EXAMPLE IX

Preparation of n-butyl-N-fluorocarbamate

A solution of 12.0 grams of n-butyl carbamate (0.1 mole) in 650 ml. water was fluorinated at 5° C. with elementary fluorine (diluted with nitrogen, 1:4) until 4.5 liters of fluorine gas was passed into the reaction mixture. At the end of the run the reaction mixture was extracted with five 50-ml. portions of methylene chloride and the solution was worked up in the manner described in Example I. The crude material was fractionated to give 3.0 grams of a colorless liquid, B.P. 45 to 50° C./0.1 to 0.3 mm., $n_D^{25}$ 1.4130, which was identified as n-butyl N-fluorocarbamate.

*Analysis.*—Calc'd for $C_5H_{10}FNO_2$ (percent): C, 44.44; H, 7.46; F, 14.06; N, 10.37. Found (percent): C, 44.90; H, 7.43; F, 14.60; N, 10.00.

EXAMPLE X

Preparation of octyl N,N-difluorocarbamate

A solution of octyl carbamate (0.08 mole) in 320 ml. dry ethylene chloride is fluorinated with elementary fluorine (diluted with nitrogen, 1:4) at −10° C. until 3.5 to 4.0 liters of fluorine gas is passed into the reaction mixture. At the end of the run the solvent is removed at reduced pressure and the residue is fractionated to give a material shown to be octyl N,N-difluorocarbamate by gas chromatography and elemental analysis.

EXAMPLE XI

Preparation of ethylene bis-N-fluorocarbamate

A solution of ethylene bis-carbamate (0.1 mole) in 650 ml. water is fluorinated at 5° C. with elementary fluorine (diluted with nitrogen, 1:4) until 4.5 liters of fluorine gas is passed into the reaction mixture. At the end of the run the reaction mixture is extracted with methylene chloride. The combined extract is then fractionated to give a material which is identified as ethylene bis-N-fluorocarbamate.

EXAMPLE XII

Preparation of polyvinyl N-fluorocarbamate

Polyvinyl carbamate is prepared by the ester interchange reaction of methyl carbamate with commercial polyvinyl alcohol (available from Du Pont under the name Elvanol). The resulting polyvinyl carbamate is then fluorinated in aqueous solution to yield polyvinyl N-fluorocarbamate.

The fluorination proceeds smoothly and little or no degradation of the polymer backbone is evident.

This polymer is also obtainable by the reaction of methyl N-fluorocarbamate with polyvinyl alcohol.

The novel N-fluorocarbamates of this invention contain a plurality of energetic N-F bonds, and are thus inherently useful as explosives. In addition, the novel compounds of this invention find application as high energy components in rocket fuel formulations. Thus, for example, the compounds prepared in accordance with this invention are useful as oxidizers, plasticizers and monomers, in the preparation of rocket propellants.

The higher molecular weight compounds of this invention are suitable as plasticizers for nitrocellulose and nitro polymers such as the nitro-substituted polyurethanes disclosed in assignee's co-pending U.S. patent application Ser. No. 728,491, filed Apr. 14, 1958, now abandoned. The novel compounds of this invention are also useful in the preparation of many other organic compounds.

Difluoramine finds valuable use as an oxidizer and is especially well suited for use as the oxidizer in conventional liquid bipropellant rockets. When used for this purpose difluoroamine is burned with such conventional fuels as hydrazine, kerosene-aniline mixtures and ethanol in a rocket engine combustion chamber. The gases thus produced are exhausted through the exhaust nozzle of the rocket engine to produce thrust. Difluoramine can be utilized in this fashion for rocket propulsion purposes by employing it as the oxidizer in the method taught in assignee's U.S. Pat. 2,771,739.

It will be understood that various modifications may be made in this invention without departing from the spirit thereof or the scope of the appended claims.

I claim:

1. Compounds of the formula:

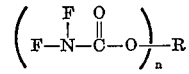

wherein R is an alkylene group of from 1 to 20 carbon atoms, having a valency equal to $n$, and $n$ is an integer having the value of 2.

2. Compounds of the formula:

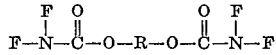

wherein R is a lower alkylene radical.

References Cited

UNITED STATES PATENTS 2,987,541   6/1961   Bissinger et al. _____ 260—482
3,375,259   3/1968   Gibson et al. _____ 260—482 X LORRAINE A. WEINBERGER, Primary Examiner P. J. KILLOS, Assistant Examiner U.S. Cl. X.R.

149—109; 260—479 C, 482 C